US011900358B2

(12) United States Patent
Bhatia et al.

(10) Patent No.: US 11,900,358 B2
(45) Date of Patent: Feb. 13, 2024

(54) SMART CARD WITH INTEGRATED LOW POWER SECONDARY COMMUNICATION NETWORK

(71) Applicant: Bank of America Corporation, Charlotte, NC (US)

(72) Inventors: Sheetal Bhatia, Mumbai (IN); Sandeep Kumar Chauhan, Hyderabad Telangana (IN)

(73) Assignee: Bank of America Corporation, Charlotte, NC (US)

( * ) Notice: Subject to any disclaimer, the term of this patent is extended or adjusted under 35 U.S.C. 154(b) by 131 days.

(21) Appl. No.: 17/826,426

(22) Filed: May 27, 2022

(65) Prior Publication Data

US 2023/0385807 A1  Nov. 30, 2023

(51) Int. Cl.
*G06Q 20/34*     (2012.01)
(52) U.S. Cl.
CPC ......... *G06Q 20/352* (2013.01); *G06Q 20/355* (2013.01)
(58) Field of Classification Search
CPC .................................................. G06Q 20/352
USPC ....................................................... 235/380
See application file for complete search history.

(56) References Cited

U.S. PATENT DOCUMENTS

2011/0047053 A1\* 2/2011 Kim ................. G01S 19/48
705/30

\* cited by examiner

*Primary Examiner* — Rafferty D Kelly
(74) *Attorney, Agent, or Firm* — Weiss & Arons LLP

(57) ABSTRACT

Systems and methods for providing an integrated secondary communication network are provided. A method may include receiving an indication of a pre-determined trigger event, and presenting, via a user interface of a smart card, an option to perform a limited subset of a set of financial services. The set of financial services may be provided to a user of the smart card by a financial institution in connection with an account to which the smart card is keyed. The method may include the smart card bypassing the primary communication network, in response to receipt of a selection to perform a service from the limited subset of the set of financial services, and transmitting, via a transmitter of the smart card to a gateway of the secondary communication network, communication packets requesting the service. The method may also include the gateway forwarding the communication packets to a server of the secondary communication network, and, in response to receipt of the communication packets, the server causing the service to be performed.

20 Claims, 5 Drawing Sheets

SMART CARD WITH INTEGRATED LOW POWER SECONDARY COMMUNICATION NETWORK

FIELD OF TECHNOLOGY

Aspects of the disclosure relate to communication networks. Specifically, aspects of the disclosure relate to integrated secondary communication networks.

BACKGROUND OF THE DISCLOSURE

Many entities rely on communication networks to provide essential services to their clients. For example, clients of a financial institutions often request services via a network, such as a cellular network. The request is often transmitted via a mobile computing device such as a smart phone.

Such networks are sometimes inoperable. For example, in a weather-related emergency, or other disruptive emergency scenario, a local cellular network may be down. Furthermore, some clients may, by choice or a result of a disadvantaged situation, may not have access to the network.

It would be desirable, therefore, to provide systems and methods for a secondary communication network that is operable even when a primary communication network is not. It would further be desirable for the secondary communication network to be integrated with tools that a client may typically already be carrying with them.

SUMMARY OF THE DISCLOSURE

Aspects of the disclosure relate to systems and methods for providing an integrated secondary communication network. Systems may include a smart card. The smart card may be keyed to an account at a financial institution that provides a user of the smart card with the ability to perform a set of financial services. The smart card may include a housing. The smart card may also include a microprocessor, a battery, a user interface, and a transmitter. The microprocessor, battery, user interface, and/or transmitter may be embedded in the housing.

Systems may include a primary communication network. The primary communication network may be configured to facilitate, via a device configured to communicate over the primary communication network, the set of financial services.

Systems may also include a secondary communication network. The secondary communication network may include a server, a plurality of end nodes that are configured to transmit communication packets, and a gateway that receives communication packets from the end nodes and forwards the communication packets to the server.

According to aspects of the disclosure, the smart card may be one of the plurality of end nodes, and the gateway may be installed proximal to a physical branch of the financial institution.

In response to a pre-determined trigger event, the smart card may be configured to present to the user, via the user interface, an option to perform a limited subset of the set of financial services.

In response to receipt of a selection to perform a service from the limited subset of the set of financial services, the smart card may be configured to bypass the primary communication network and transmit, to the server via the gateway, communication packets requesting the service.

In response to receipt of the communication packets requesting the service, the server may be configured to cause the service to be performed.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
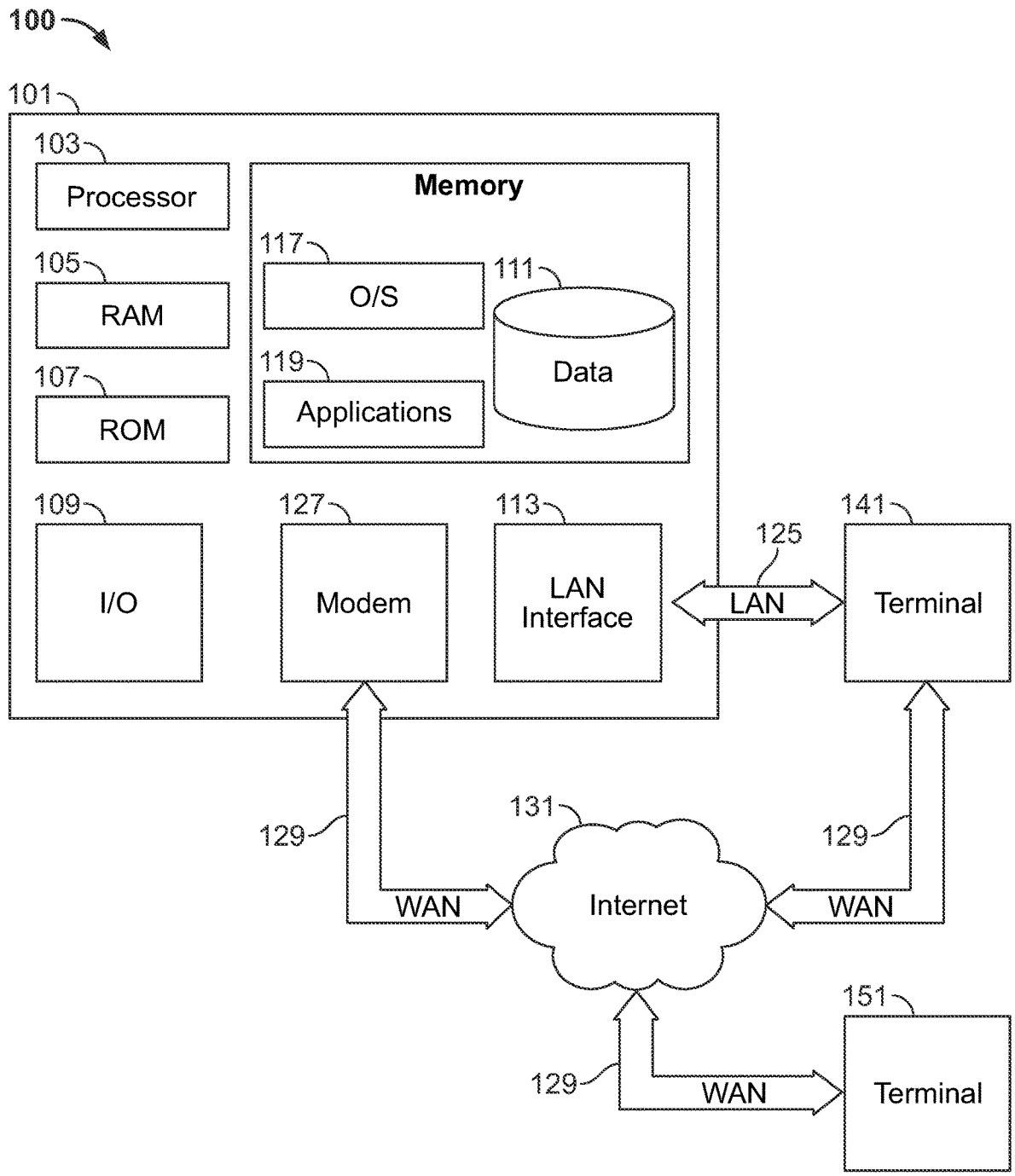
FIG. 1 shows an illustrative system in accordance with principles of the disclosure.

Aspects of the disclosure relate to systems and methods for providing an integrated secondary communication network. Systems may include a smart card. The smart card may be keyed to an account at a financial institution that provides a user of the smart card with the ability to perform a set of financial services. The smart card may include a housing. The smart card may also include a microprocessor, a battery, a user interface, and a transmitter. The microprocessor, battery, user interface, and/or transmitter may be embedded in the housing.

In some embodiments, the housing may be made from metal and/or plastic. The smart card may have an outer appearance that looks substantially like a typical credit or debit card. For example, the housing may have dimensions that conform to the ISO/IEC 7810 ID-1 standard. The dimensions may, in some embodiments, be no greater than 86 millimeters×54 millimeters×0.8 millimeters. The user interface may, in certain embodiments, include a touchscreen. In some embodiments, the smart card may also include an input sensor. The input sensor may be part of the user interface. The input sensor may be tactile, audio, visual, or any other suitable input sensor.

The system may include a primary communication network. The primary communication network may be configured to facilitate, via a device configured to communicate over the primary communication network, the set of financial services.

The system may also include a secondary communication network. The secondary communication network may include a server, a plurality of end nodes that are configured to transmit communication packets, and a gateway that receives communication packets from the end nodes and forwards the communication packets to the server. The secondary communication network may, in some embodiments, include a plurality of gateways.

According to aspects of the disclosure, the smart card may be one of the plurality of end nodes, and one or more gateways may be installed proximal to a physical branch of the financial institution. The gateway may be inside the branch. The gateway may, in some embodiments, be near the branch.

In response to a pre-determined trigger event, the smart card may be configured to present to the user, via the user interface, an option to perform a limited subset of the set of financial services.

In response to receipt of a selection to perform a service from the limited subset of the set of financial services, the smart card may be configured to bypass the primary communication network and transmit, to the server via the gateway, communication packets requesting the service.

In response to receipt of the communication packets requesting the service, the server may be configured to cause the service to be performed.

In some embodiments, the pre-determined trigger event may be an indication that the primary communication network is inoperable. The indication may include a direct message from or about the primary communication network.

In some embodiments, the system includes a machine-learning (ML) engine that is configured to access online sources of current events. The online sources may, for example, include news outlets and social media outlets. Based on data received from the online sources of current events, the ML engine may be configured to calculate a likelihood of the primary communication network being inoperable. In some embodiments, the likelihood exceeding a predetermined threshold may qualify as an indication that the primary communication network is inoperable.

In some embodiments, the pre-determined trigger event may be an opt-in from the user submitted via the user interface, a telephonic communication, or an online portal of the account. For example, the user may be able to initiate a transaction request via the user interface of the smart card.

In some embodiments, the pre-determined trigger event may be an indication that the user is disassociated with the primary communication network. For example, the user's device to access the primary network may be inoperable. In another example, the user may not be subscribed to the primary network. The indication may be a message or option originating from the user. The indication may be a message received from the primary network itself.

In certain embodiments, based on measures associated with the receipt of communication packets from the smart card at the gateway, the server may be configured to geo-locate the smart card. The pre-determined trigger event may, in some embodiments, be an indication that the user is within a pre-determined distance from the branch. For example, the communication packets transmitted by the smart card may be received by multiple gateways. Based on timing and location of the receipt of the communication packets, the system may be able to triangulate and determine the location of the smart card transmitting the packets. When the location is within a predetermined distance from the branch, the predetermined trigger may be satisfied.

In some embodiments, systems may further include a machine-learning (ML) engine that, in response to the pre-determined trigger, may be configured to predict a particular service the user intends to request at the branch. For example, historical data may show that the user performs a certain transaction or request at certain intervals or at certain times. If those conditions are satisfied, the user may be approaching the branch to perform the transaction or request. In another example, the historical data may show that the user recently unsuccessfully attempted to perform a transaction or request. The user may now be approaching the branch to perform the transaction or request. In these embodiments, the limited subset of financial services initiated by the smart card may include adding the user to a queue for the particular service. The limited subset of financial services may also include performing any preliminary steps that may be useful or necessary prior to performance of the particular service (e.g., preparation of documents, cash, personnel, or other suitable resources).

Some embodiments may include transmitting to the smart card information regarding a position in the queue, and displaying the information on the smart card via the user interface. The information may, for example, include a place in the queue. Information may also include instruction to the user once the user enters the branch (e.g., proceed to a certain window).

In certain embodiments, the primary communication network may be a cellular network.

In some embodiments, the secondary communication network may be a low power network. In certain preferred embodiments, the low power network may be a LoRaWAN (Long Range Wide Area Network) network. LoRaWAN networks are described in further detail below.

As described at the LoRa developer portal,[1] LoRa is an RF modulation technology for low-power, wide area networks (LPWANs). The name, LoRa, is a reference to the extremely long-range data links that this technology enables. Created by Semtech to standardize LPWANs, LoRa provides for long-range communications: up to three miles (five kilometers) in urban areas, and up to 10 miles (15 kilometers) or more in rural areas (line of sight). A key characteristic of the LoRa-based solutions is ultra-low power requirements, which allows for the creation of battery-operated devices that can last for up to 10 years. Deployed in a star topology, a network based on the open LoRaWAN protocol is perfect for applications that require long-range or deep in-building communication among a large number of devices that have low power requirements and that collect small amounts of data.

[1] See "https://lora-developers.semtech.com/documentation/tech-papers-and-guides/lora-and-lorawan/"

Advantages

LoRaWAN Gateways enable what is known as a star-on-star network, which has many benefits and advantages.

Redundancy to Ensure Minimal Service Disruptions: When an Edge Node on the LoRaWAN network broadcasts data through LoRa, all gateways within the range of that device will receive the messages and forward them to the network server. The network server will then deduplicate the messages and choose the best gateway to transmit a downlink message back to the End Node, if required.

For a network targeted at industrial IoT solutions, this is a major advantage. For one, any faults in a single LoRaWAN Gateway will not cause the system to fail entirely, since other gateways can continue to receive data from the End Nodes. This also makes it easier to maintain the Gateways since the system may not have to be shut down during maintenance. Overall, the usage of LoRaWAN Gateways helps to keep the network reliable and operating with minimal service disruptions.

Maximum Affordability & Scalability: Each LoRaWAN Gateway is relatively affordable and can service up to 1000 additional End Nodes. With the LoRaWAN network topology, wireless network coverage can be increased easily and affordably without disturbing the network. Thus, the LoRaWAN network can be easily scaled to suit the needs of any application or environment.

Ever-Expanding Global Network: LoRaWAN operates on an unlicensed radio band (e.g., in industrial, scientific, and medical bands), which allows operation of LoRaWAN gateways in most countries legally and at no cost. If there is no coverage where one is located, one can simply add their own gateway, which they and others in their area can then use. With a strong community and support from the LoRa Alliance, LoRaWAN networks continue to grow.

When Other Communication Methods are Unsuitable: Such applications include agriculture, or environmental monitoring in rural areas where there is no satellite signal for cellular communication, nor the infrastructure for short-range communications like Wi-Fi routers and access points.

In fact, it is for this reason that LoRa is particularly powerful for smart metering applications in buildings. Due to the long range nature of LoRa, only a single gateway is required to receive electrical/water consumption data from all meters in the building. This significantly reduces the cost of network infrastructure in comparison to Wi-Fi. Furthermore, LoRa much more suitable for indoor usage, which is a scenario where cellular connectivity commonly struggles.

When there are Strict Requirements to be Met: LoRa & LoRaWAN infrastructure is built to be robust and operational for many years. Thus, it is a good choice for industrial use cases where network failures are not acceptable. This may include surveillance systems, emergency alert systems, and agricultural monitoring systems, where an assurance of operational reliability is especially important. Due to the same characteristics, LoRa devices are also a prime candidate for field deployment applications like remote logistics and supply chain tracking and wearables.

When Network Privacy is Needed: LoRa enables individuals and businesses to easily build their own networks for internal use with dedicated hardware and infrastructure. Not only is this a more affordable solution than seeking enterprise products on the market, it also grants users greater flexibility and management capabilities with the system. Isolated from external intervention and networks and equipped with integrated encryption capabilities, a LoRaWAN private network also improves data security for the information that is transmitted on it.

Range: a single LoRa-based gateway can receive and transmit signals over a distance of more than 10 miles (15 kilometers) in rural areas. Even in dense urban environments, messages are able to travel up to three miles (five kilometers), depending on how deep indoors the end devices (end nodes) are located.

Battery life: the energy required to transmit a data packet is quite minimal given that the data packets are relatively small and only transmitted a few times a day. Furthermore, when the end devices are asleep, the power consumption is measured in milliwatts (mW), allowing a device's battery to last for many, many years.

Capacity: a LoRaWAN network can support millions of messages. However, the number of messages supported in any given deployment depends upon the number of gateways that are installed. A single eight-channel gateway can support a few hundred thousand messages over the course of a 24-hour period. If each end device sends 10 messages a day, such a gateway can support about 10,000 devices. If the network includes 10 such gateways, the network can support roughly 100,000 devices and one million messages. If more capacity is required, additional gateways may be added to the network.

Geolocation: Can be accomplished indoors and outdoors, in a manner that is accurate without the need for GPS, and with minimal or no battery life impact.

FUOTA: Firmware Updates Over-the-Air for applications and the LoRaWAN stack.

Roaming: Roaming issues may be reduced or eliminated due to seamless handovers from one network to another.

Security: Embedded end-to-end AES 128 encryption.

Radio Modulation and LoRa

A proprietary spread-spectrum modulation technique derived from existing Chirp Spread Spectrum (CSS) technology, LoRa offers a trade-off between sensitivity and data rate, while operating in a fixed-bandwidth channel of either 125 KHz or 500 KHz (for uplink channels), and 500 KHz (for downlink channels). Additionally, LoRa uses orthogonal spreading factors. This allows the network to preserve the battery life of connected end nodes by making adaptive optimizations of an individual end node's power levels and data rates. For example, an end device located close to a gateway should transmit data at a low spreading factor, since relatively little link budget is needed. However, an end device located several miles from a gateway will need to transmit with a much higher spreading factor. This higher spreading factor provides increased processing gain, and higher reception sensitivity, although the data rate will, necessarily, be lower.

LoRa is purely a physical (PHY), or "bits" layer implementation, as defined by the OSI seven-layer Network Model. Instead of cabling, the air is used as a medium for transporting LoRa radio waves from an RF transmitter in an IoT device to an RF receiver in a gateway, and vice versa.

LoRaWAN Network Architecture

LoRa is the physical (PHY) layer, i.e., the wireless modulation used to create the long-range communication link. LoRaWAN is an open networking protocol that delivers secure bi-directional communication, mobility, and localization services standardized and maintained by the LoRa Alliance.

LoRaWAN End Nodes: End Nodes refer to devices at the end of the network, which are equipped with sensors to collect and monitor data. They usually come in the form of low power microcontrollers that can be deployed for years without any requirement for maintenance, and are equipped with a LoRa transmitter to send data packets to the Gateways. End Nodes can be deployed anywhere—security or safety monitoring systems, vending machines, even pet tracking are just some examples where they can be placed.

A LoRaWAN-enabled end device is a sensor or an actuator which is wirelessly connected to a LoRaWAN network through radio gateways using LoRa RF Modulation.

In the majority of applications, an end device is an autonomous, often battery-operated sensor that digitizes physical conditions and environmental events. Typical use cases for an actuator include: street lighting, wireless locks, water valve shut off, leak prevention, among others.

When they are being manufactured, LoRa-based devices are assigned several unique identifiers. These identifiers are used to securely activate and administer the device, to ensure the safe transport of packets over a private or public network and to deliver encrypted data to the Cloud.

LoRaWAN Gateways: LoRaWAN Gateways are the bridge between End Nodes and the Network. To receive information from the End Nodes, gateways are equipped with a LoRa concentrator and can, in essence, be considered as a router of sorts. Gateways are routers equipped with a LoRa concentrator, allowing them to receive LoRa packets. You can usually find two kinds of gateways: 1) Gateways running on a minimal firmware, making them low-cost and easy to use, running only the packet forwarding software; and 2) Gateways running an operating system, for which the packet forwarding software is run as a background program (e.g. Kerlink IoT Station, Multitech Conduit, etc.). This gives more liberty to the gateway administrator to manage their gateway and to install their own software.

A LoRaWAN gateway receives LoRa modulated RF messages from any end device in hearing distance and forwards these data messages to the LoRaWAN network server (LNS), which may be connected through an IP backbone. There is no fixed association between an end device and a specific gateway. Instead, the same sensor can be served by multiple gateways in the area. With LoRaWAN, each uplink packet sent by the end-device may be received by all gateways within reach. This arrangement significantly reduces packet error rate (since the chances that at least one gateway will receive the message are relatively high), significantly reduces battery overhead for mobile/nomadic sensors, and allows for low-cost geolocation (assuming the gateways in question are geolocation-capable).

The IP traffic from a gateway to the network server can be backhauled via Wi-Fi, hardwired Ethernet or via a Cellular connection. LoRaWAN gateways operate entirely at the physical layer and, in essence, are LoRa radio message forwarders. They check the data integrity of each incoming LoRa RF message. If the integrity is not intact, that is, if the CRC is incorrect, the message will be dropped. If correct the gateway will forward it to the LNS, together with some metadata that includes the receive RSSI level of the message as well as an optional timestamp. For LoRaWAN downlinks, a gateway executes transmission requests coming from the LNS without any interpretation of the payload. Since multiple gateways can receive the same LoRa RF message from a single end device, the LNS performs data de-duplication and deletes all copies. Based on the RSSI levels of the identical messages, the network server typically selects the gateway that received the message with the best RSSI when transmitting a downlink message because that gateway is the one closest to the end device in question.

Furthermore, LoRa allows for scalable, cost-optimized gateway implementation, depending on deployment objectives. For example, in North America, 8-, 16-, and 64-channel gateways are available.

The 8-channel gateways are the least expensive. The type of gateway needed will depend on the use case. Eight- and 16-channel gateways are available for both indoor and outdoor use. Sixty-four channel gateways are only available in a carrier-grade variant. This type of gateway is intended for deployment in such places as cell towers, the rooftops of tall buildings, etc.

It is important to distinguish that LoRaWAN End Nodes communicate with LoRaWAN Gateways through low power LoRaWAN, whereas Gateways communicate with the Network Server through higher bandwidth communication protocols like WiFi, Ethernet or Cellular.

Network server: The LoRaWAN network server (LNS) manages the entire network, dynamically controls the network parameters to adapt the system to ever-changing conditions, and establishes secure 128-bit AES connections for the transport of both the end to end data (from LoRaWAN end device to the end users Application in the Cloud) as well as for the control of traffic that flows from the LoRaWAN end device to the LNS (and back). The network server ensures the authenticity of every sensor on the network and the integrity of every message. At the same time, the network server cannot see or access the application data.

In general, all LoRaWAN network servers may share the following features:
  Device address checking
  Frame authentication and frame counter management
  Acknowledgements of received messages
  Adapting data rates using the ADR protocol
  Responding to all MAC layer requests coming from the device,
  Forwarding uplink application payloads to the appropriate application servers
  Queuing of downlink payloads coming from any Application Server to any device connected to the network
  Forwarding Join-request and Join-accept messages between the devices and the join server Application servers: are responsible for securely handling, managing and interpreting sensor application data. They also generate all the application-layer downlink payloads to the connected end devices.

Join server: The join server manages the over-the-air activation process for end devices to be added to the network. This may include authentication of the end devices.

The join server contains the information required to process uplink join-request frames and generate the downlink join-accept frames. It signals to the network server which application server should be connected to the end-device, and performs the network and application session encryption key derivations. It communicates the Network Session Key of the device to the network server, and the Application Session Key to the corresponding application server.

For that purpose, it may be important for the join server to contain the following information for each end-device under its control:
  DevEUl (end-device serial unique identifier)
  AppKey (application encryption key)
  NwkKey (network encryption key)
  Application Server identifier
  End-Device Service Profile Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to making a selection on a user interface. The input/output module may also include one or more speakers for providing audio output and a video display device for providing textual, audio, audiovisual, and/or graphical output. The input and output may be related to computer application functionality. The input and output may be related to making a selection on a user interface.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to making a selection on a user interface.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
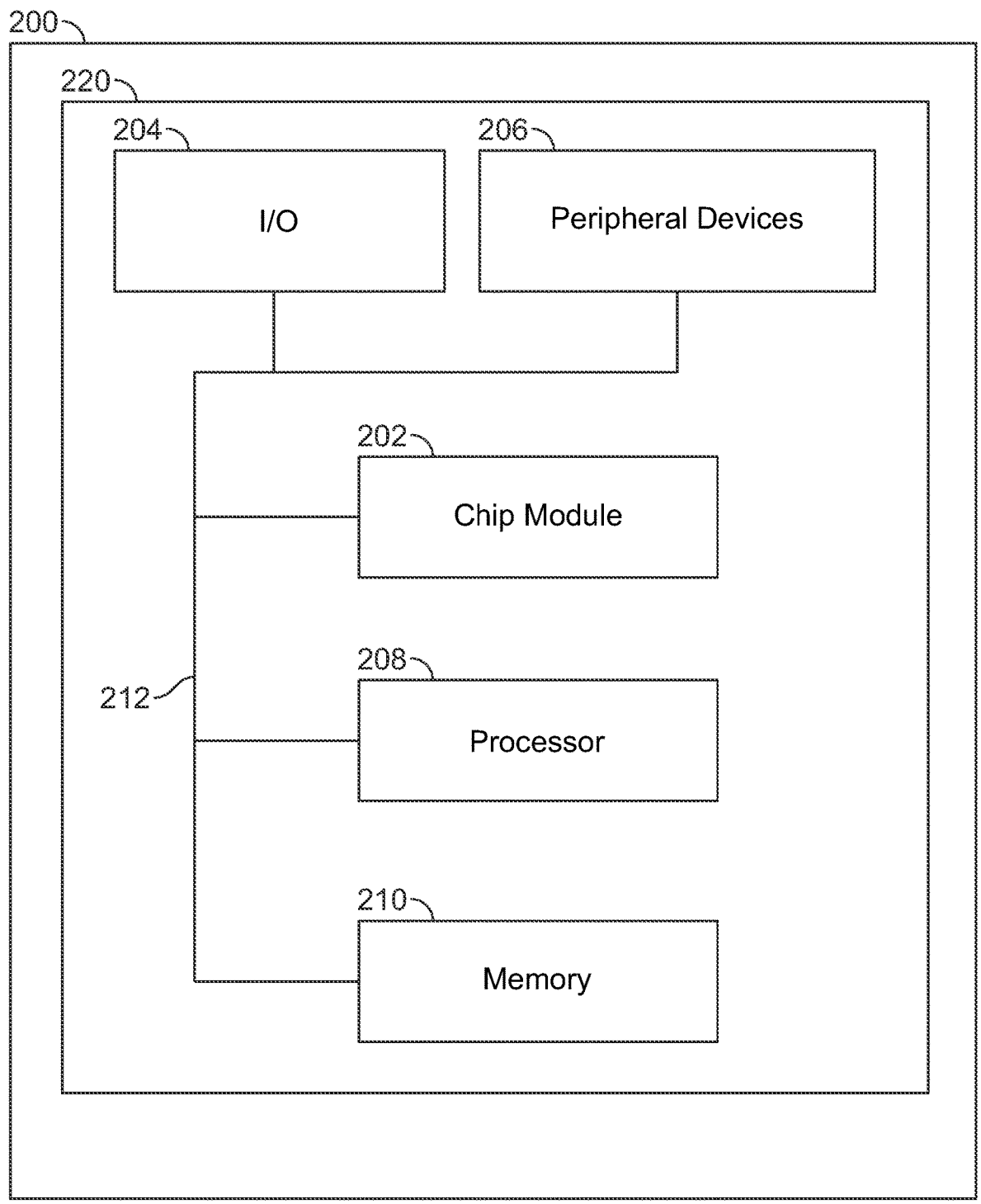
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
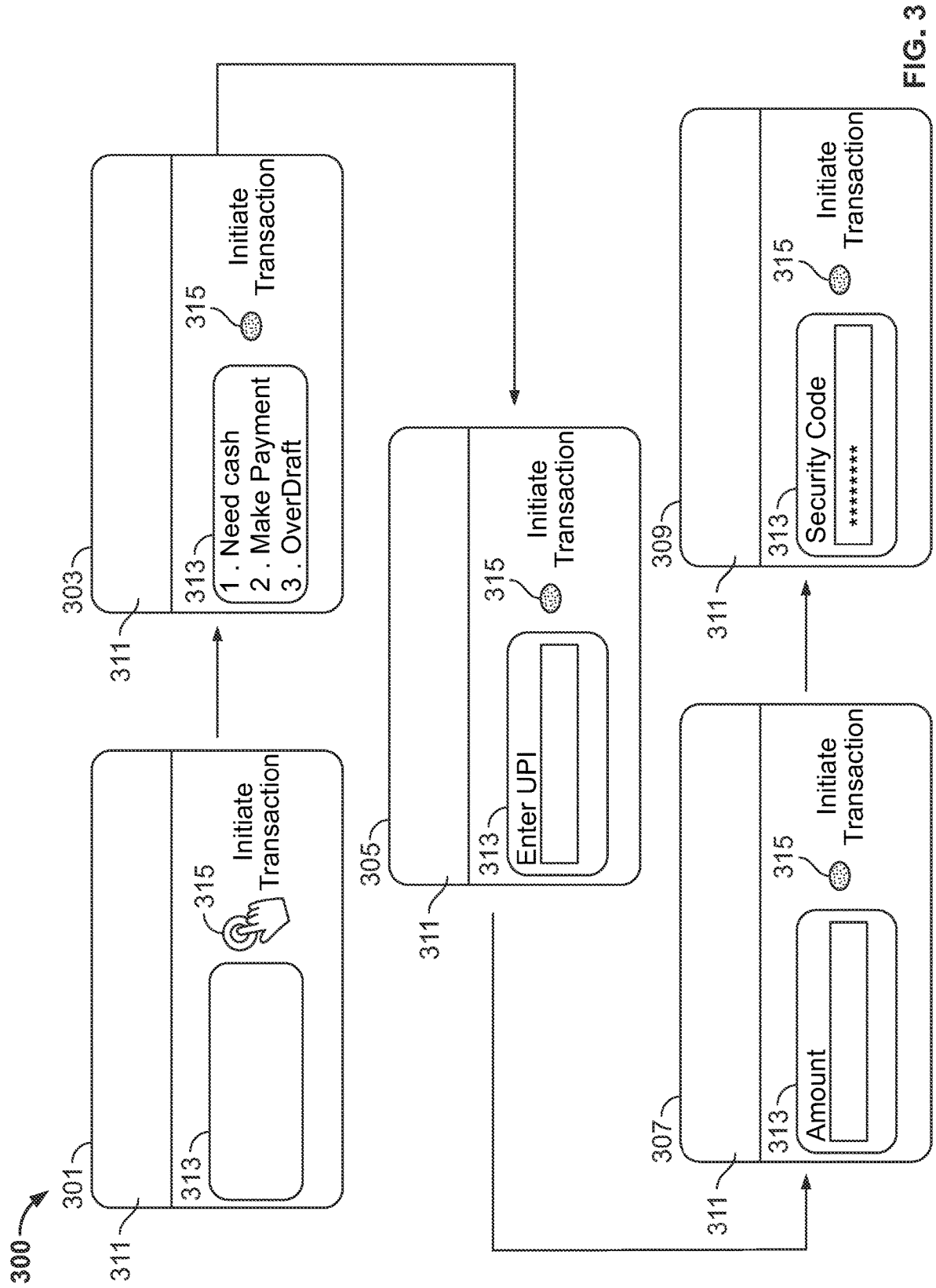
FIG. 3 shows an illustrative diagram in accordance with principles of the disclosure.

FIG. 3 shows illustrative diagram 300 in accordance with principles of the disclosure. Diagram 300 shows an illustrative smart card 311 with an embedded user interface 313. The smart card may also include a tactile input sensor 315. In some embodiments, the user interface may be a touch-screen. The touchscreen may, in certain embodiments, encompass the user interface as well as the tactile input sensor. The tactile input sensor may be part of the user interface. At 301, the user may input a selection, via the tactile input sensor, to initiate a transaction. At 303, the user interface may display a limited subset of services. The limited subset of services may include an option to withdraw cash, make a payment, manage overdraft, and/or other suitable services.

At 305, in response to a selection of a presented option, the user interface may request routing information. For example, the user interface may request a Unified Payment Interface (UPI) number, or other suitable information that may provide routing information which may be useful for a selected financial service such as a transfer of funds.

When a user requests a service that needs more information, the user interface may request the information, as shown at 307. For example, when a user requests a cash withdrawal, the user interface may present a query inquiring what amount the user wants to withdraw.

At 309, the user interface may request a verification. For example, the user interface may request a verification such as a security code, personal identification number (PIN), password, personal information (e.g., birthday, social security, etc.), one-time password (OTP), biometric verification, or any other suitable identification.

Figure 4:
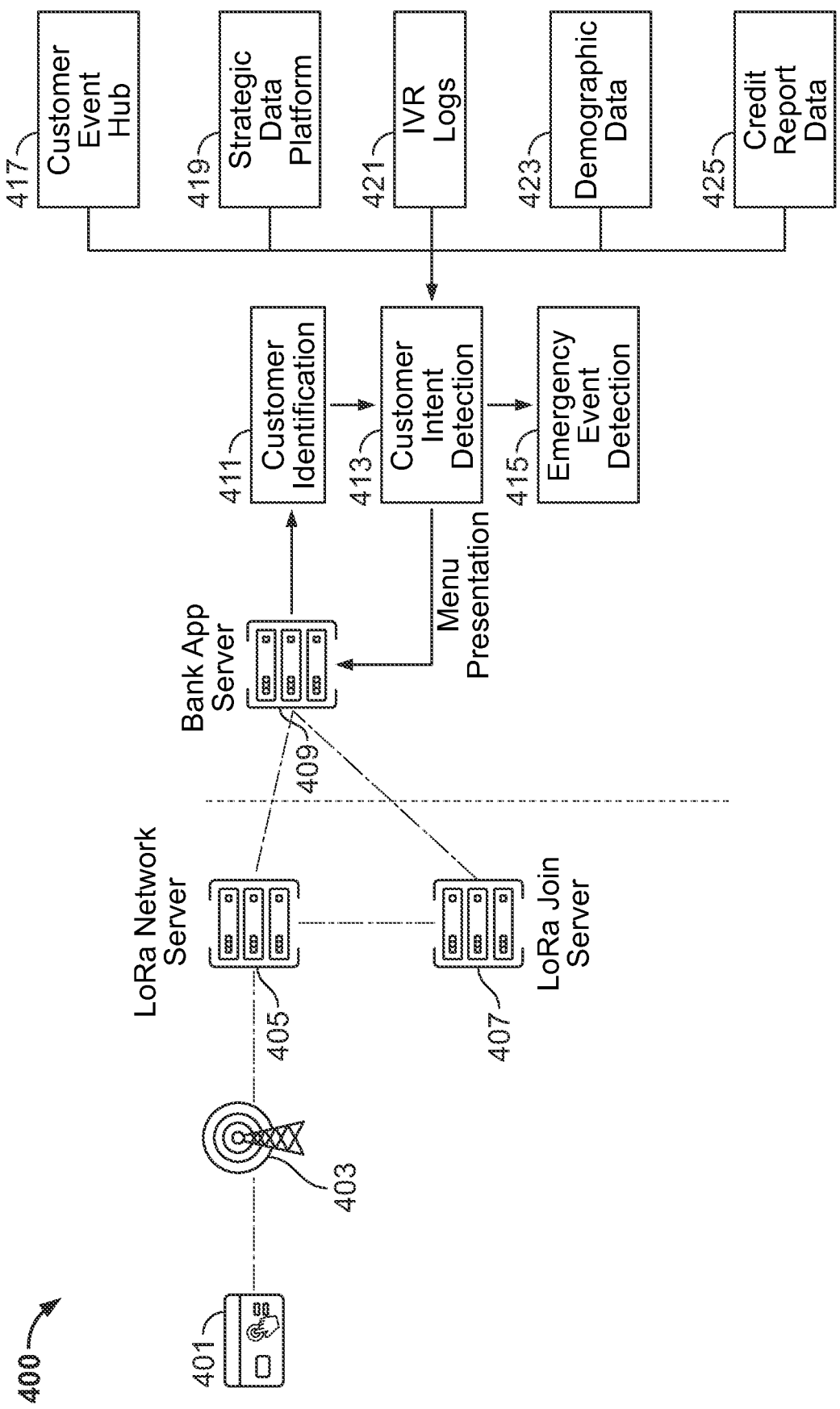
FIG. 4 shows another illustrative diagram in accordance with principles of the disclosure.

FIG. 4 shows illustrative diagram 400 in accordance with principles of the disclosure. Diagram 400 shows a system architecture of an illustrative integrated secondary communication network. The network may include smart card 401. The network may include gateway 403. The network may include a Network Server 405. The network may include a Join Server 407. The Network and/or Join Servers may be connected to an Application Server 409. The Application Server provide customer identification 411, customer intent detection 413 (which may include a ML engine for determining a user's intent), and/or emergency event detection 415 (which may, in certain embodiment, include gathering real-time data from online news or social media sites). Input for the Application Server may include customer event hub 417, strategic data platform 419, Interactive Voice Response (IVR) logs 421 (i.e., logs from an automated phone system), demographic data 423 (including residential information), and credit report data 425.

Figure 5:
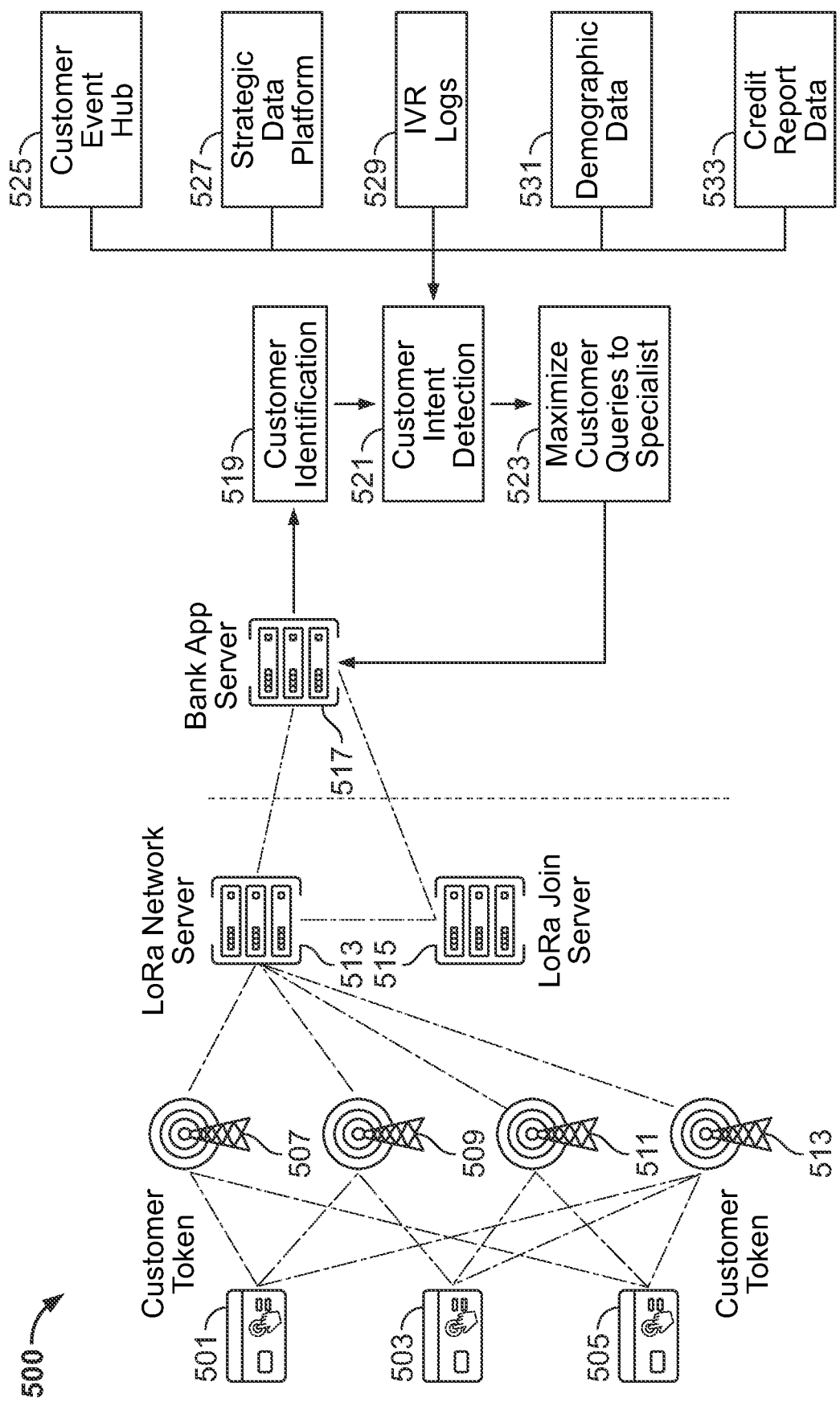
FIG. 5 shows yet another illustrative diagram in accordance with principles of the disclosure.

FIG. 5 shows illustrative diagram 500 in accordance with principles of the disclosure. Diagram 500 shows a system architecture of another illustrative integrated secondary communication network. The network may include multiple smart cards, 501-505, each of which may be associated with a unique user. Each smart card may transmit packets with a unique identifier (e.g., the smart card account number, or a user ID at the financial institution combined with the last four digits of the smart card account number). The identifier may be useful for the server of the secondary network (e.g., LoRa Network Server 513) to stich together the communication packets from one smart card into a complete message (e.g., a service request). The complete message may have been chunked, or split, into smaller communication packets due to limitations inherent to the low power nature of LoRa communications. The identifier may also be useful for the smart card to identify an incoming message that is intended for that smart card.

The network may include multiple gateways, 507-513. The multiple gateways may enable increased throughput of communication packets in the network. The multiple gateways may also facilitate multiple measurements of receiving communications from a particular smart card, which may allow for geolocation of the smart card. The multiple gateways may communicate with Network Server 513.

Network elements 513-533 may be substantially similar to network elements 405-425 shown in FIG. 4. Element 523, however, may serve to maximize customer queries to a specialist. For example, when the system determines that a user's intent is to approach a branch to perform or request a specific service, the system may determine preliminary steps that may be set in motion to increase efficiency when the user reaches the branch. This may include placing the user in a queue for the service, and/or preparing documents, cash, personnel, or other suitable resources for the service.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for smart cards with integrated low power secondary communication networks are provided. Persons skilled in the art will appreciate that the present invention can be practiced by other than the described embodiments, which are presented for purposes of illustration rather than of limitation, and that the present invention is limited only by the claims that follow.

What is claimed is:
1. A system comprising:
a smart card, wherein the smart card:
is keyed to an account at a financial institution that provides a user of the smart card with the ability to perform a set of financial services; and
comprises a housing, and further comprises, embedded in the housing:
a microprocessor;
a battery;
a user interface; and
a transmitter;

a primary communication network, the primary communication network configured to facilitate, via a device configured to communicate over the primary communication network, the set of financial services; and a secondary communication network, the secondary communication network comprising:

a server;

a plurality of end nodes that are configured to transmit communication packets; and a gateway that receives communication packets from the end nodes and forwards the communication packets to the server;

wherein:

the smart card is one of the plurality of end nodes;

the gateway is installed proximal to a physical branch of the financial institution;

in response to a pre-determined trigger event, the smart card is configured to present to the user, via the user interface, an option to perform a limited subset of the set of financial services;

in response to receipt of a selection to perform a service from the limited subset of the set of financial services, the smart card is configured to bypass the primary communication network and transmit, to the server via the gateway, communication packets requesting the service; and in response to receipt of the communication packets requesting the service, the server is configured to cause the service to be performed.

2. The system of claim 1 wherein the primary communication network is a cellular network.

3. The system of claim 1 wherein the secondary communication network is a LoRaWAN network.

4. The system of claim 1 wherein the pre-determined trigger event is an indication that the primary communication network is inoperable.

5. The system of claim 4 further comprising a machine-learning (ML) engine that is configured to:

access online sources of current events, said online sources comprising news outlets and social media outlets; and based on data received from the online sources of current events, calculating a likelihood of the primary communication network being inoperable;

wherein the indication comprises the likelihood exceeding a predetermined threshold.

6. The system of claim 1 wherein the pre-determined trigger event is an opt-in from the user submitted via:

the user interface;

a telephonic communication; or an online portal of the account.

7. The system of claim 1 wherein the pre-determined trigger event is an indication that the user is disassociated with the primary communication network.

8. The system of claim 1 wherein:

based on measures associated with the receipt of communication packets from the smart card at the gateway, the server is configured to geolocate the smart card; and the pre-determined trigger event is an indication that the user is within a pre-determined distance from the branch.

9. The system of claim 8 wherein:

the system further comprises a machine-learning (ML) engine that, in response to the pre-determined trigger, is configured to predict a particular service the user intends to request at the branch; and the limited subset of financial services comprises adding the user to a queue for the particular service.

10. The system of claim 9 further configured to:

transmit to the smart card information regarding a position in the queue; and display the information on the smart card via the user interface.

11. The system of claim 1 wherein:

the housing is made from metal and/or plastic;

the housing has dimensions that conform to the ISO/IEC 7810 ID-1 standard, said dimensions being no greater than 86 millimeters×54 millimeters×0.8 millimeters; and the user interface is a touchscreen.

12. A method for providing an integrated secondary communication network, the method comprising:

receiving an indication of a pre-determined trigger event;

presenting, via a user interface of a smart card in response to the pre-determined trigger event, an option to perform a limited subset of a set of financial services, said set of financial services that are provided to a user of the smart card by a financial institution in connection with an account to which the smart card is keyed;

the smart card bypassing, in response to receipt of a selection to perform a service from the limited subset of the set of financial services, the primary communication network;

transmitting, via a transmitter of the smart card to a gateway of the secondary communication network, communication packets requesting the service;

the gateway forwarding the communication packets requesting the service to a server of the secondary communication network; and in response to receipt of the communication packets requesting the service, the server causing the service to be performed.

13. The method of claim 12 wherein:

the primary communication network is a cellular network; and the secondary communication network is a LoRaWAN network.

14. The method of claim 12 wherein the pre-determined trigger event is an indication that the primary communication network is inoperable.

15. The method of claim 14 further comprising:

accessing, via a machine-learning (ML) engine, online sources of current events, said online sources comprising news outlets and social media outlets; and based on data received from the online sources of current events, calculating, via the ML engine, a likelihood of the primary communication network being inoperable;

wherein the indication comprises the likelihood exceeding a predetermined threshold.

16. The method of claim 12 wherein the pre-determined trigger event is an opt-in from the user submitted via:

the user interface;

a telephonic communication; or an online portal of the account.

17. The method of claim 12 wherein the pre-determined trigger event is an indication that the user is disassociated with the primary communication network.

18. The method of claim 12 wherein:

the method further comprises the server geolocating the smart card based on measures associated with the receipt of communication packets from the smart card at the gateway; and the pre-determined trigger event is an indication that the user is within a pre-determined distance from the branch.

19. The method of claim 18 wherein:

in response to the pre-determined trigger, the method further comprises predicting, via a machine-learning (ML) engine, a particular service the user intends to request at the branch; and the limited subset of financial services comprises adding the user to a queue for the particular service;

wherein the method further comprises:

transmitting to the smart card information regarding a position in the queue; and displaying the information on the smart card via the user interface.

20. The method of claim 12 wherein:

the housing is made from metal and/or plastic;

the housing has dimensions that conform to the ISO/IEC 7810 ID-1 standard, said dimensions being no greater than 86 millimeters×54 millimeters×0.8 millimeters; and the user interface is a touchscreen.

\* \* \* \* \*